INTERFERENCE DISCRIMINATING APPARATUS

Filed Oct. 7, 1968

United States Patent Office 3,495,244

Patented Feb. 10, 1970

3,495,244

INTERFERENCE DISCRIMINATING APPARATUS

Richard La Rosa, South Hempstead, N.Y., assignor to Hazeltine Research, Inc., a corporation of Illinois Filed Oct. 7, 1968, Ser. No. 765,283
Int. Cl. G01s 7/36
U.S. Cl. 343—17.1 9 Claims

ABSTRACT OF THE DISCLOSURE

Disclosed are apparatus for use in information processing channels such as radar receivers, whereby spurious pulse interference is suppressed even in the presence of spurious steady signal interference. The invention uses circuitry, including filters and AGC circuits, in parallel with a portion of the main processing channel to separate a spurious pulse into its frequency components while preventing overload due to the spurious steady signals. The pulse components are subsequently reconstituted to create a pulse type control signal for disabling the main channel for the duration of the spurious pulse.

This invention relates to apparatus which discriminates against spurious pulses in information processing channels which are undesirably affected by spurious pulse type signals.

Apparatus for discriminating to a limited degree against spurious pulse type interference in information processing channels are known in the art. For example, in narrow band radar receivers, one such technique uses a broadband front end amplifier followed by a limiter. Spurious pulses remain undistorted after broadband amplification and are subsequently clipped by the limiter, thereby preventing ringing of a narrow band filter which typically follows the limiter. This approach has the inherent serious disadvantage of being subject to overload from spurious continuous wave or other strong steady signals in the passband of the broadband amplifier. Such signals would cause the limiter to disable the channel so that information signals, as well as interference signals, would be blocked.

It is therefore an object of the present invention to provide new and improved spurious pulse discriminating apparatus which are not subject to the disadvantages and limitations of prior such apparatus.

It is another object of the present invention to provide new and improved spurious pulse discriminating apparatus capable of preventing undesirable effects upon information processing channels even in the presence of spurious steady signals.

In accordance with the invention, in an information processing channel which is undesirably affected by spurious pulse type input signals, a spurious pulse discriminating apparatus comprises signal translating means, which is included in the channel and has an input for receiving information signals and spurious pulse type signals, for translating the information signals to an output thereof and for preventing such translation in response to a supplied control signal. The apparatus also includes a first means which is responsive to the supplied spurious pulse type signals for separating the frequency components of each such signal into a plurality of groups, each group consisting of selected frequency components. Additionally, included is a plurality of second means each coupled to the first means, and each for separately translating one of the groups of frequency components and for maintaining that group within a predetermined amplitude range. A third means is also included which is coupled to each of the second means and which is responsive to the translated groups of frequency components for developing a control signal and for supplying the control signal to the signal translating means for preventing translation during the occurrence of each spurious input pulse. The spurious pulse type signals are therefore suppressed and undesirable effects on the channel are reduced.

For a better understanding of the present invention, together with other and further objects thereof reference is had to the following description taken in connection with the accompanying drawing, and its scope will be pointed out in the appended claims.

Figure 1:
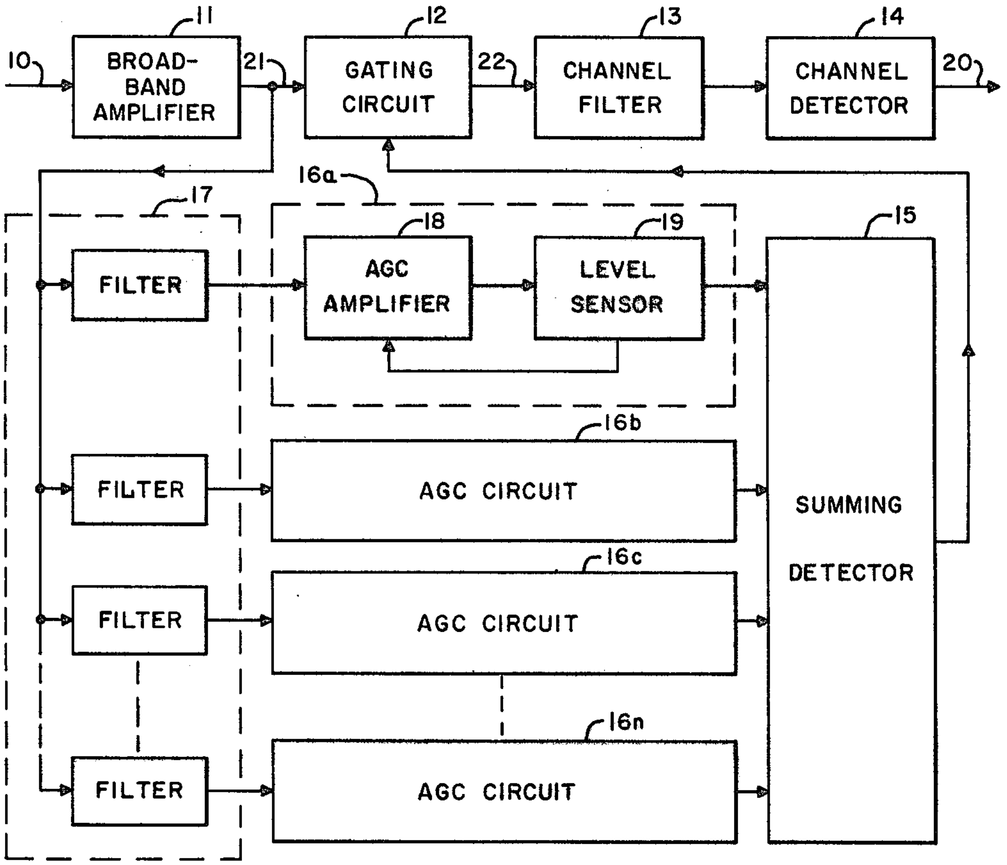
FIG. 1 is a block diagram of a spurious pulse discriminating apparatus constructed in accordance with one form of the present invention, shown in application with a signal processing channel.

Referring to the block diagram of FIG. 1, there is shown by example a particular information processing channel with which the spurious pulse discriminating apparatus of the present invention can operate. This channel is one which processes narrow band modulated signals, such as in a radar receiver.

The information processing channel includes a broadband amplifier 11 as the front end and a narrow band channel filter 13, which is coupled to a channel detector 14. The narrow band channel filter 13 serves to eliminate frequencies outside the frequency range of interest. The channel detector 14 separates the information from the carrier frequency. If a spurious modulated pulse were permitted to reach the narrow band channel filter 13, thereby causing it to ring, undesirable and deleterious effects would be produced at the channel output 20. This invention functions to prevent such effects by operating on potentially disruptive pulses before they reach the input to the channel filter 22.

For the purposes of this description, the input to the broadband amplifier 11 will be referred to as the channel input 10 and the output of the detector 14 will be referred to as the channel output 20. Other appropriate stages and components may precede input 10 or follow output 20, or both.

Included in the channel between the broadband amplifier 11 and the channel filter 13 is a signal translating means, shown as a gating circuit 12, for translating information signals to its output and for preventing translation in response to a supplied control signal. To the input 21 of the gating circuit 12 are supplied the information signals and the spurious signals, pulse type and steady type. In the context of the described embodiment, the information signals are normally modulated continuous wave signals; the spurious pulse type signals are normally short duration bursts of continuous wave or multiharmonic signals with a spectrum lying within the broadband amplifier passband; and the spurious steady signals have harmonics within the passband of the broadband amplifier, but outside the narrow band channel filter passband. Spurious steady signals refer to continuous wave of multiharmonic signals which exist for the entire time period of interest in this discussion.

These information and spurious signals are also supplied to the circuitry used to develop the control signal. The signals are supplied to a first means, such as filter bank 17, consisting of a plurality of filters, responsive to said spurious pulse type signals, for separating the frequency components of each such signal into a plurality of groups, each group having selected frequency components. The spurious steady signals and information signals are also included within certain of the selected groups.

Coupled to the outputs of each filter in the filter bank 17, is a plurality of second means, such as AGC circuits 16*a*, *b* . . . *n* (*n* indicating an undetermined number of such circuits in the set), each for separately translating one of the groups of frequency components, including the spurious steady signals, and for maintaining that group within a predetermined amplitude range. Each AGC circuit, e.g., 16*a*, typically includes an amplifier 18, whose gain is subject to control from an external feedback signal. The amplifier output is supplied to a level sensing circuit 19 capable of monitoring the level of the output of the amplifier and supplying the feedback signal necessary to maintain the amplifier output within the desired amplitude range.

The AGC circuits 16*a*, *b* . . . *n* are each coupled to inputs of the third means, shown as summing detector circuit 15, which is responsive to the translated groups of frequency components, for developing a control signal and for supplying the control signal to the signal translating means, gating circuit 12, for preventing translation during the occurrence of each spurious input pulse.

Figure 2:
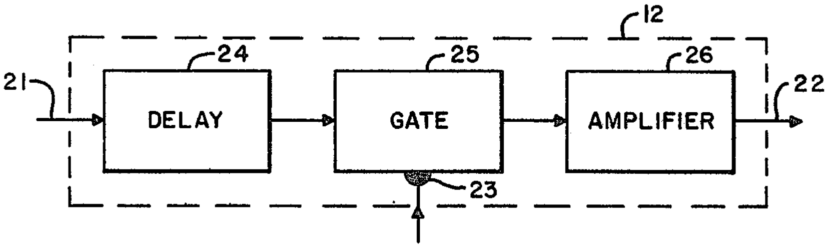
FIG. 2 is a block diagram of a particular configuration of the gating circuit 12 of FIG. 1, and In FIG. 3, a block diagram of a configuration of the summing detector 15 of FIG. 1 is shown.

FIG. 2 illustrates, in block form, one embodiment of the gating circuit. 12. This embodiment includes delay means 24 which compensates for delays inherent in the development of the control signal. In some applications a separate delay means, such as 24, may not be necessary. The delay output would then be coupled to gate 25. The control signal is supplied to gate control input 23. The gate output is coupled to an amplifier 26 for further processing of the information signal. Amplification may merely be desired for general signal processing purposes or may be required because of losses in the gate 12.

Figure 3:
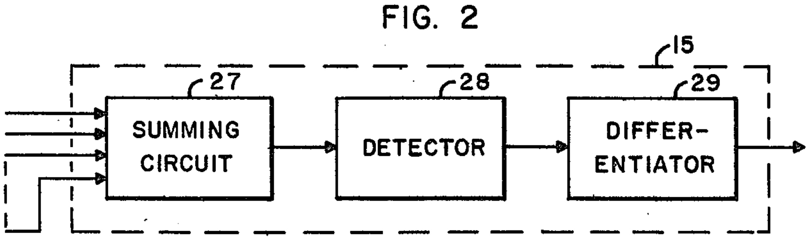

FIG. 3 illustrates an embodiment of the summing detector 15 circuit in block form. This figure shows a summing circuit 27 for coherently summing the translated groups of frequency components. The output of the summing circuit 27 is a modulated spurious pulse signal similar to that applied at the channel input and is coupled to the detector 28. The detector 28 produces the control signal which operates the gating circuit 12. The output of the detector is coupled to differentiator 29, the inclusion of which is optional, which may be used to improve the shape of the control signal.

OPERATION

Starting at the input of the channel 10 in FIG. 1, information signals, spurious modulated pulse type signals and possibly spurious steady signals are supplied to the input 10. These spurious signals may be due to unintentional causes or may be a result of intentional attempts at jamming the information processing channel. The steady signals can be of a high amplitude which, in prior art discriminating apparatus, would cause channel disabling as mentioned heretofore. All signals are amplified by the broadband amplifier 11 which is usually of low gain to avoid possibility of overload. The amplifier 11 should be broadband to pass the spurious pulse type signals substantially undistorted. The broadband amplified signals are supplied to the gating circuit 12 and to the filter bank 17. The plurality of filters within the bank 17 are to have substantially differing frequency passbands cooperating to encompass the frequency spectrum of the spurious pulse and steady signals. The filters separate the pulse components into a plurality of groups of frequencies, the frequency components of each group substantially differing from the other groups. The spurious steady signals will be included within certain of the groups on the basis of the frequencies involved. Each filter output of the filter bank 17 is applied to the input of an AGC circuit, e.g., 16*a*. The AGC circuits 16*a*, *b* . . . *n*, amplify the groups of pulse components and have the capability of changing gain as a function of signal level. If one of the AGC channels receives a high level steady signal with the pulse components, the gain of that channel would be considerably reduced so that the output of that particular channel will have little effect thereafter. After AGC amplification, the translated pulse component groups are supplied to the summing detector 15. Referring now to FIG. 3, the pulse components are coherently summed in the summing circuit 27, thereby substantially reconstituting the modulated spurious pulse. The failure of one or a few of the pulse groups to contribute to the reconstituted signal will merely result in a somewhat distorted pulse after summation, but it is seen that overload, which occurred in the prior art, is avoided. The reconstituted pulse is applied to the broadband detector 28 which removes the carrier and produces a pulse which is used as a control signal.

Returning to FIG. 1, it should be noted that when the spurious pulse is applied to the filter bank 17, each of the filters will ring individually. However, the coherent adding in the summing detector 15 substantially cancels the ringing effects to reproduce the basic pulse shape.

The pulse produced at the detector output may be used as the signal to directly control the operation of the gating circuit 12. It is likely, however, that the limited number of separate filters in the filter bank 17 as well as the loss of some of the channels when high level steady signals are present, will cause some distortion of the detected pulse shape. To obviate this effect, differentiator 29, shown in FIG. 3, may be included to sharpen the leading and trailing edges of the control signal for more rapid gating of the main channel.

The control signal is applied to the gate control input 23, shown in FIG. 2, of the gating circuit 12 to disable the main channel for the approximate duration of the spurious pulse and thereby suppresses the appearance of the spurious pulse at the channel filter. Therefore, undesirable effects on the processing channel, such as filter ringing, are eliminated.

While there has been described what is at present considered to be the preferred embodiment of the invention, it will be obvious to those skilled in the art that various changes and modifications may be made therein, without departing from the invention.

What is claimed is:

1. In an information processing channel which is undesirably affected by spurious pulse type input signals, a spurious pulse discriminating apparatus comprising:

signal translating means, included in said channel and having an input for receiving information signals and spurious pulse type signals, for translating said information signals to an output thereof and for preventing such translation in response to a supplied control signal;

first means, responsive to said supplied spurious pulse type signals, for separating the frequency components of each such signal into a plurality of groups, each group having selected frequency components;

a plurality of second means, each coupled to said first means, each for separately translating one of said groups of frequency components and for maintaining that group within a predetermined amplitude range;

and third means, coupled to each of said second means and responsive to said translated groups of frequency components, for developing a control signal and for supplying said control signal to said signal translating means for preventing translation during the occurrence of each spurious input pulse;

whereby the spurious pulse type signals are suppressed and undesirable effects on the channel are reduced.

2. A spurious pulse discriminating apparatus in accordance with claim 1 wherein said signal translating means includes a gating circuit responsive to said control signal for preventing translation during the approximate interval of the spurious pulse.

3. A spurious pulse discriminating apparatus in accordance with claim 1 wherein said first means includes a plurality of filters, each of limited bandwidth of substantially different frequency range from any other, with an overall bandwidth substantially encompassing the expected spurious pulse spectrum.

4. A spurious pulse discriminating apparatus in accordance with claim 1 wherein said second means includes an AGC circuit comprising an amplifier and level sensor to control the amplitude range of the amplifier output.

5. A spurious pulse discriminating apparatus in accordance with claim 1 wherein said third means includes means for coherently summing and processing said translated groups of frequency components for developing a pulse type control signal.

6. In an information processing channel which is undesirably affected by spurious pulse type input signals, a spurious pulse discriminating apparatus comprising:

signal translating means, included in said channel and having an input for receiving information signals and spurious steady and pulse type signals, for translating said information to an output thereof and for preventing such translation in response to a supplied control signal;

first means, responsive to said supplied spurious signals, for separating the frequency components of each pulse type signal and said steady signal into a plurality of groups, each group having selected frequency components;

a plurality of second means, each coupled to said first means, each for separately translating one of said groups of frequency components and for maintaining that group within a predetermined amplitude range;

and third means, coupled to each of said second means and responsive to said translated groups of frequency components, for developing a pulse type control signal and for supplying said control signal to said signal translating means for preventing translation during the occurrence of each spurious input pulse;

whereby the spurious pulse type signals are suppressed and undesirable effects on the channel are reduced.

7. In an information processing channel with broadband front end which is undesirably affected by modulated spurious pulse type input signals, a spurious pulse discriminating apparatus comprising:

signal translating means, included in said channel and having an input for receiving information signals and modulated spurious pulse type signals, for translating said information to an output thereof and for preventing such translation in response to a supplied control signal;

first means, responsive to said modulated suplied spurious pulse type signals, for separating the frequency components of each such signal into a plurality of groups, each group having selected frequency components;

a plurality of second means, each coupled to said first means, each for separately translating one of said groups of frequency components and for maintaining that group within a predetermined amplitude range;

and third means, coupled to said second means and responsive to said translated groups of frequency components, for coherently summing and detecting the modulated pulse to develop a pulse type control signal and for supplying said control signal to said signal translating means for preventing translation during the occurrence of each suprious input pulse;

whereby the spurious pulse type signals are suppressed at the output of the information processing channel and undesirable effects on the channel are reduced.

8. A spurious pulse discriminating apparatus in accordance with claim 7 wherein said detecting means includes a differentiator type circuit at the output of the detector portion for improving the control pulse shape, for rapid gating of the main channel.

9. In a radar receiver having a broadband front end which is undersirably affected by spurious modulated pulse type signals, a spurious pulse discriminating apparatus comprising:

a gating circuit, included in said receiver and having an input for receiving information and spurious steady signals and spurious modulated pulse type signals supplied to an input thereof, for translating said information to an output thereof and for preventing such translation in response to a supplied pulse control signal;

a plurality of filters included in a filter bank and responsive to said suppiled spurious signals, for separating the frequency components of each pulse type signal and said steady signals into a plurality of groups, each group having selected frequency components;

a plurality of AGC circuits, each coupled to a filter output of said filter bank, each for separately amplifying one of said groups of frequency components and for maintaining that group within a predetermined amplitude range;

means for coherently summing the amplified groups of frequency components to substantially reconstitute the modulated spurious pulse;

means for detecting and shaping said substantially reconstituted pulse for developing a pulse type control signal and for supplying said control signal to said gating circuit for preventing translation during the occurrence of each spurious input pulse;

whereby the spurious pulse type signals are suppressed and undesirable effects on the receiver are reduced.

References Cited

UNITED STATES PATENTS 3,162,814 12/1964 Aasen et al. -------- 325—478

RICHARD A. FARLEY, Primary Examiner

U.S. Cl. X.R.

325—323, 473, 478; 328—167